US012705868B2

(12) United States Patent
Metzen

(10) Patent No.: US 12,705,868 B2
(45) Date of Patent: Aug. 11, 2026

(54) COMPUTER-IMPLEMENTED METHOD AND SYSTEM FOR ASCERTAINING A MISCLASSIFICATION VALUE DURING THE CLASSIFICATION OF IMAGES INTO AT LEAST ONE IMAGE CATEGORY BY A CLASSIFICATION ALGORITHM

(71) Applicant: Robert Bosch GmbH, Stuttgart (DE)

(72) Inventor: Jan Hendrik Metzen, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 259 days.

(21) Appl. No.: 18/543,699

(22) Filed: Dec. 18, 2023

(65) Prior Publication Data

US 2024/0221370 A1 Jul. 4, 2024

(30) Foreign Application Priority Data

Jan. 3, 2023 (DE) ..................... 10 2023 200 021.0

(51) Int. Cl.

*G06V 10/776* (2022.01)
*G06F 40/279* (2020.01)
*G06V 10/764* (2022.01)
*G06V 10/77* (2022.01)
*G06V 10/774* (2022.01)

(52) U.S. Cl.

CPC .......... *G06V 10/776* (2022.01); *G06F 40/279* (2020.01); *G06V 10/764* (2022.01); *G06V 10/7715* (2022.01); *G06V 10/774* (2022.01)

(58) Field of Classification Search

CPC .. G06V 10/764; G06V 10/774; G06V 10/776; G06V 10/7715; G06V 30/413; G06F 40/279

See application file for complete search history.

(56) References Cited

U.S. PATENT DOCUMENTS

2017/0214946 A1* 7/2017 Rubenczyk .......... H04N 21/854
2022/0130136 A1 4/2022 Ando

OTHER PUBLICATIONS

Wiles, et al. (Discovering Bugs in Vision Models using Off-the-shelf Image Generation and Captioning) (Year: 2022).*

(Continued)

*Primary Examiner* — Daniel G Mariam
(74) *Attorney, Agent, or Firm* — Norton Rose Fulbright US LLP

(57) ABSTRACT

A computer-implemented method for ascertaining a misclassification value during classification of images into at least one image category by a classification algorithm. The method includes: providing an input text file, which includes a keyword using which the input text file is assigned to a predetermined image category of a plurality of image categories, the input text file including indications relating to at least one image feature for the predetermined image category and at least one value indication for the at least one image feature; generating at least one image file using a text-into-image generation algorithm, the image file including a synthetic image that is assigned to the predetermined image category and has the at least one image feature and the at least one value indication; classifying the generated, synthetic image using the classification algorithm into at least one of the plurality of image categories; and ascertaining the misclassification value.

11 Claims, 2 Drawing Sheets

(56) References Cited

OTHER PUBLICATIONS

Crowson, et al.: "VQGAN-CLIP: Open Domain Image Generation and Editing with Natural Language Guidance," arXiv:2204.08583v2, (2022), pp. 1-32.
MIKOtAJCZYK and Grochowski.: "Data augmentation for improving deep learning in image classification problem," 2018 international Interdisciplinary PhD Workshop (IIPhDW) IEEE (2018), pp. 117-122; doi: 10.1109/IIPHDW.2018.8388338.
Radford, et al.: "Learning Transferable Visual Models From Natural Language Supervision," Proceedings of 88th International Conference on Machine Learning PMLR 139, (2021), pp. 1-16.
Reed, et al.: "Generative Adversarial Text to Image Synthesis," Proceedings of 88th International Conference on Machine Learning, New York, USA, JMLR: W&CP 48 (2016), pp. 1-10.
The Illustrated VQGAN, Lj Miranda (2021), pp. 1-27 URL:https://ljvmiranda921.github.io/notebook/2021 /08/08/clip-vqgan/ [recherch.
"Stable Diffusion"—https://huggingface.co/CompVis/stable-diffusion>, pp. 1-4. Downloaded Dec. 18, 2023.

* cited by examiner

COMPUTER-IMPLEMENTED METHOD AND SYSTEM FOR ASCERTAINING A MISCLASSIFICATION VALUE DURING THE CLASSIFICATION OF IMAGES INTO AT LEAST ONE IMAGE CATEGORY BY A CLASSIFICATION ALGORITHM

CROSS REFERENCE

The present application claims the benefit under 35 U.S.C. § 119 of German Patent Application No. DE 10 2023 200 021.0 filed on Jan. 3, 2023, which is expressly incorporated herein by reference in its entirety.

FIELD

The present invention relates to a computer-implemented method and a system for ascertaining a misclassification value during the classification of images into at least one image category by a classification algorithm.

BACKGROUND INFORMATION

Image classification is well-known in the related art and relates to the task of extracting information from an image in order to enable an assignment of the image to a specific image category and/or image class on the basis of this information. The resulting cluster from such an image classification can be used to create, for example, thematic categories.

The classification of image data can in principle be carried out by a human analyst, but is increasingly automated and carried out by machine learning approaches and/or artificial intelligence methods. In the conventional methods for classification of image data, misclassifications repeatedly occur in that images that are actually to be assigned to a specific category are assigned to a different category by the classification algorithm, due to image-specific and/or environment-specific and/or process-specific conditions.

One reason for such a misclassification is often systematic errors of an underlying classification algorithm. Systematic errors usually relate to a specific subgroup of images in which a trained classification algorithm has a high probability of a misclassification ("error"), wherein all images in the subgroup have certain properties in common. A human analyst would be able to assign this subgroup to the correct category without any problem, since a human analyst has sufficient domain knowledge and a large amount of experience. The subgroup of images classified incorrectly by the classification algorithm thus appears systematically coherent to a human observer, but is systematically classified incorrectly by a machine learning algorithm.

The presence of systematic errors is problematic for the use of classification algorithms in safety-critical fields. It is thus necessary to apply methods for checking the corresponding classification algorithm to systematic errors of this kind, in particular in these safety-relevant fields.

Several methods have already been proposed to recognize systematic errors of a classification algorithm. For example, one of these methods has the name DOMINO and fits an error-aware mixture model of a classification algorithm into the latent space. A different method, on the other hand, embeds a linear support vector machine (SVM) classification algorithm into the latent space in order to differentiate image data from a class into correctly and incorrectly classified.

In the first case, clusters having a high error rate represent systematic errors, whereas in the second case, a vector points orthogonally to an SVM hyperplane in a direction of a systematic error. The identified, systematic errors can be interpreted by generating a label that is embedded in the vicinity of the cluster center or points in the SVM direction.

However, the conventional methods require the presence of a marked or labeled image data set (so-called hold-out sets), which was not used during training of the classification algorithm. In addition, the methods require separate multi-modal embedding, which allows images and texts to be embedded in a common latent, i.e. not directly visible and/or detectable, space. There is therefore still potential for improvement.

An object of the present invention is to provide a computer-implemented method and/or a system for ascertaining a misclassification value during the classification of images into at least one image category by a classification algorithm, which method at least partially overcomes the disadvantages of the related art and in particular functions without the provision of labeled image data that have not been used previously.

The object may be achieved by a computer-implemented method for ascertaining a misclassification value during the classification of images into at least one image category by a classification algorithm according to certain features of present invention. The object also may be achieved by a system for ascertaining a misclassification value during the classification of images into at least one image category by a classification algorithm according to features of the present invention.

SUMMARY

According to a first aspect of the present invention, a computer-implemented method is provided for ascertaining a misclassification value during the classification of images into at least one image category by a classification algorithm. According to an example embodiment of the present invention, the method comprises at least the following steps: providing at least one input text file, which comprises a keyword by means of which the input text file is assigned to a predetermined image category of a plurality of image categories, wherein the input text file comprises indications relating to at least one image feature for the predetermined image category and at least one value indication for the at least one image feature; generating at least one image file by means of a text-into-image generation algorithm, which image file comprises a synthetic image that is assigned to the predetermined image category and has the at least one image feature and the at least one value indication; classifying the generated, synthetic image by means of the classification algorithm into at least one of the plurality of image categories; and ascertaining the misclassification value by comparing the image category classified by the classification algorithm with the predetermined image category.

According to a second aspect of the present invention, a system is provided for ascertaining a misclassification value during the classification of images into at least one image category by a classification algorithm. According to an example embodiment of the present invention, the system comprises a providing device that is designed to provide at least one input text file, which comprises a keyword by means of which the input text file is assigned to a predetermined image category of a plurality of image categories, wherein the input text file comprises indications relating to at least one image feature for the predetermined image category and at least one value indication for the at least one image feature. The system comprises an evaluating and computing device that is configured to execute a text-into-image generation algorithm in order to generate at least one image file, which comprises a synthetic image that is assigned to the predetermined image category and has the at least one image feature and the at least one value indication; to execute a classification algorithm in order to classify the generated, synthetic image into at least one of the plurality of image categories; and to ascertain the misclassification value by comparing the image category classified by the classification algorithm with the predetermined image category.

The method and/or system according to example embodiments of the present invention is preferably designed to ascertain a misclassification value for the classification of the synthetic image data on the basis of the generated synthetic image data. According to the present invention, it is thus no longer necessary to provide labeled image data that have not yet been used for a classification in order to obtain information about a susceptibility to errors of a specific classification into a specific image category. Rather, in order to find such a misclassification value, the image data are automatically generated by the text-into-image generation algorithm and already by generation are assigned to a certain image category due to the keyword indication. However, this assignment is not yet known to the classification algorithm before the actual classification of such a synthetically generated image, and therefore such a synthetically generated image can be used (without labeling by an expert) for ascertaining the misclassification value.

The method according to the present invention can be used, for example, in the technical context of generic facial recognition and/or in the technical context of vehicle assistance systems and/or in the technical context of autonomous driving and/or in the technical context of computer vision and/or in the technical context of quality monitoring manufacturing components during automatic optical inspection and/or in the technical context of other technical fields in which image data are evaluated and/or categorized and/or classified, in order in this way to recognize misclassifications and to avoid or at least reduce misclassifications, preferably for future classifications, by correspondingly adapting the classification algorithm. Particularly preferably, the present invention can be used in the analysis of data that are obtained by at least one (image) sensor. The at least one sensor can, for example, ascertain measured values of an environment in the form of sensor signals. Such sensor signals can be present, for example, as digital images and/or videos. The sensor can be, for example, a camera and/or a lidar sensor and/or an ultrasonic sensor. The present invention can thus be used, for example, for image and/or video and/or audio analysis downstream of the detection, and there to classify the captured image data in order to recognize a misclassification rate and thus to be able to minimize same. The present invention can in particular be used to classify the sensor data and/or to recognize the presence of objects in the sensor data and/or to perform semantic segmentation of the sensor data, e.g., in relation to traffic signs, road surfaces, pedestrians and/or vehicles. According to the present invention, anomalies in the form of at least one systematic error of the technical system can be ascertained during the classification of the sensor data.

Such misclassifications in the classification of images can in principle occur in any classification of images by a classification algorithm for any image category. For example, such misclassifications can occur in the classification of faces into predetermined categories, such as age, sex, origin, skin color, etc. For example, such misclassifications can occur in the classification of images of a traffic situation if, for example, a vehicle included in the image is to be assigned to a specific vehicle category. For example, such misclassifications can occur in the classification of images of manufacturing components during automated quality control and/or manufacturing monitoring. The misclassification can be caused by the classification algorithm, for example, incorrectly interpreting peripheral image information present in addition to the object to be classified and/or incorrectly assessing background information and/or incorrectly assessing image properties and/or object properties of the object and/or object detail to be classified. The incorrect assessment can be caused, for example, by incorrect detection and/or assessment of geometric and/or optical properties of the object to be classified and/or the other image information.

The present invention thus aims to identify an in particular systematic error in the classification of images without the need for a marked or labeled holdout data set. According to the present invention, a text-into-image generation algorithm is used for this purpose, which can be implemented, for example, by the open-source algorithm "Stable Diffusion" (https://huggingface.co/CompVis/stable-diffusion). Such a text-into-image generation algorithm preferably maps text requests and/or text specifications, for example represented by the at least one keyword, onto a set of images, so that the images generated in this way preferably each reproduce something that corresponds to a meaning of the at least one keyword or the text request or by means of which the latter is described. For example, for a specific class $c \in C$ of an output space of the classification algorithm, an image that is included in this class c can be generated by a text request or the input text file, such as "an image of c with [ . . . ]". Here, the class c preferably corresponds to the class with the systematic error that is to be identified by the classification algorithm during classification. In such a text request, text components that differ from the at least one keyword and do not relate to the class c can also be included. These text components are preferably ignored or included as peripheral image information by the text-into-image generation algorithm during the generation of images. According to the present invention such a text request or the input text file particularly preferably comprises, in addition to the image category, further indications relating to at least one image feature for the predetermined image category and at least one value indication for the at least one image feature, which are directly taken into account during the generation of the images and are preferably converted into graphical contents of the mapping space. Thus, by selecting the input text file, images of class c can be generated that preferably look realistic but occur in variable and/or non-typical contexts and/or poses and/or perspectives and/or other conditions. This is preferably determined according to the selection of the indications relating to at least one image feature and/or according to the value indication.

According to an example embodiment of the present invention, if the images synthetically generated in this way are then at least mostly classified incorrectly by the classification algorithm, i.e., $c \neq c$, the misclassification value and/or an indication of a misclassification can be ascertained. The generated images form candidates or an image request or image prompt of the misclassification, from which the systematic error of the classification algorithm can preferably be derived. Based on such an image request, further images can particularly preferably be generated by in particular evolutionary adaptation of the input text file in order to maximize a misclassification rate in this way. Thus, for example, specific indications relating to image features are refined and/or varied more in further steps in order to ascertain the weighting in the form of a maximized misclassification rate of such indications. In a further step, for example, value indications for a weighted indication relating to image features can then be refined and/or varied in order to further maximize the misclassification rate. The maximum misclassification rate preferably forms the systematic error of the classification algorithm in the image space as precisely as possible in that the image category and the indications relating to an image feature and the value indication for the image features are refined in such a way that all the images that are generated with such indications are recognized incorrectly by the classification algorithm.

A disadvantage of the conventional methods for ascertaining a misclassification value is that they require the availability of a labeled holdout set for identifying systematic errors. Since systematic errors are also more likely to occur in unusual/rare data, their identification requires a holdout data set that contains such cases, which can be considered unrealistic. In contrast, the method according to the present invention works with synthetically generated image data that do not require manual marking or labeling. Furthermore, the synthesizing can be made dependent on a text prompt or an input text file. In this way, rare and/or unrealistic and/or statistically improbable image situations and/or mapping situations can also be synthesized by a correspondingly adapted text prompt.

Within the meaning of the present disclosure, the term "plurality" is to be understood as multiple image categories. In other words, the wording "a plurality of image categories" is to be understood as meaning at least two image categories.

In a preferred embodiment of the present invention, multiple input text files are provided, which each comprise the keyword assigned to the predetermined image category and in which the relevant indication relating to the at least one image feature and/or the relevant at least one value indication for the relevant image feature is/are varied. An image file is preferably generated in each case for each of the multiple input text files, which image file comprises a synthetic image that is assigned to the predetermined image category and has the relevant at least one image feature and the relevant at least one value indication. Preferably, each of the generated, synthetic images is classified by the classification algorithm into at least one of the plurality of image categories. A relevant misclassification value is preferably ascertained for each of the classified images. As a result, multiple images with different or mutually varied image features and/or with different or mutually varied value indications can be generated, so that these images are available to the classification algorithm for classification. The classification algorithm preferably classifies each of the generated images. If at least some of the images are classified incorrectly, commonalities of image features and/or value indications of these incorrectly classified images can be ascertained, for example. In this way, the at least one misclassification value can preferably be ascertained.

In a preferred embodiment of the present invention, the respectively ascertained misclassification value for the corresponding input text file is stored. For this purpose, the system can comprise, for example, a storage device that is designed at least for temporary data storage. It can be a volatile and/or a non-volatile storage medium.

In a preferred embodiment of the present invention, the input text file is ascertained for which the highest misclassification value is ascertained. In the case of the system, for example, the evaluating and computing device can be configured to ascertain the input text file for which the highest misclassification value is ascertained. Alternatively, it is possible for the system to comprise a further ascertaining device for this purpose. By ascertaining the input text file for which the highest misclassification value was ascertained, it can preferably be found out which indication(s) relating to at least one image feature and/or which value indication (s) this input text file comprises. In a next step, further text files can be generated in which these image feature (s) and/or value indication (s) are preferably refined further in order to thereby obtain a further limitation for ascertaining the systematic error. From these further refined text files, further images can preferably be generated in each case by the text-into-image generation algorithm, which images can then particularly preferably be classified by the classification algorithm, so that a misclassification value can in each case be ascertained again in this way for these refined synthetic image data. A maximum value and preferably the associated input text file (s) can again be ascertained from these newly ascertained misclassification values. Thus, according to the present invention, the image feature and/or the value indication can be limited more and more, in particular by evolutionary adaptation of the input text files, in order to preferably ascertain the systematic error.

In a preferred embodiment of the present invention, further text files are generated on the basis of the ascertained input text file, in which further text files the value indications for the image feature of the ascertained input text file are varied. The system can, for example, comprise a generating device that is designed to generate, on the basis of the ascertained input text file, the further text files in which the value indications for the image feature of the ascertained input text file are varied. The generating device can be implemented by the evaluating and computing device or can be provided as a separate unit.

In a preferred embodiment of the present invention, further image files are generated on the basis of the respectively generated text files. For this purpose, the system can comprise a generating device which is designed to generate the further image files on the basis of the respectively generated text files. The generating device can be implemented by the evaluating and computing device or can be provided as a separate unit.

In a preferred embodiment of the present invention, the respectively generated, synthetic images are classified by the classification algorithm into at least one of the plurality of image categories. In the case of the system, the evaluating and computing device is preferably configured to classify the respectively generated, synthetic images into at least one of the plurality of image categories by applying the classification algorithm.

In a preferred embodiment of the present invention, the misclassification value is ascertained for each of the classified images by comparing the image category classified by the classification algorithm with the predetermined image category. The evaluating and computing device can be configured to ascertain the misclassification value for each of the classified images by comparing the image category classified by the classification algorithm with the predetermined image category. For this purpose, the system can also comprise an independent device and/or unit.

Particularly preferably, the method according to the present invention proceeds as follows according to a preferred embodiment for finding a systematic error of the classification algorithm when an evolutionary algorithm is used. First, the in particular pretrained classification algorithm f is provided, the in particular pretrained text-into-image generation algorithm g is provided, and the at least one input text file or request template T is provided, which comprises, in addition to the keyword relating to the category or class c, preferably at least one feature indication $A_1, \ldots, A_j$ and at least one value indication $a_{j1}, \ldots, a_{jMj}$ per feature indication. Preferably, for R steps, when the population size, i.e., the set of input text files, is less than N, a sample of a genotype g or a relevant text content of the relevant input text file for the class c of the form $\{c, (A_{j1}, a_{j1})\}$ is taken, where c is the uniform (random) class, $A_{j1}$ is a uniform (random) feature indication from A1, . . . , $A_j$, and $a_j$ is a uniform (random) value indication for this feature indication. If the population size is greater than or equal to N, an oldest genome type or the contents of the oldest input text file is preferably removed from the population. Particularly preferably, K genotypes are then selected from the population according to the random principle (typically K=3). Preferably, the genotype with the highest misclassification value or the highest fitness in the evolutionary sense is selected from these K genotypes. A duplication of the selected genotype is preferably carried out on the basis of the selected genome type, wherein the feature indication(s) and/or value indication(s) included therein from a predetermined set of feature indications and/or value indications are preferably varied according to the random principle in order in this way to obtain at least one new genotype g for a new input text file. Particularly preferably, an instantiation of the at least one new input text file with the newly varied genotype g is then carried out. The text request t=T(g) is thus obtained. Particularly preferably, R samples are taken from the text-image model $x_1, \ldots x_R \sim G(t(g))$. Particularly preferably, a misclassification rate F of f is ascertained in the samples, wherein $$F = 1/R\sum_{i=1}^{R} 1_{f(xi)\neq ci},$$

where $1_{f(xi)\neq ci}$ assumes the value 1 if f(xi)≠ci and 0 otherwise. Preferably, the genotype g can be stored with the fitness F in the population, so that the genotype with the highest fitness or the highest misclassification value can be returned.

In a preferred embodiment of the present invetnion, the provision of the at least one input text file comprises generating the at least one text file by an evolutionary algorithm. Particularly preferably, the evolutionary algorithm comprises properties that enable a tournament selection as metaheuristic, in which therefore in particular input text files that do not lead to a desired maximum misclassification value are automatically removed from the selection for the further evolution stage (selection of the fittest individuum). By means of the method according to the present invention, input text files adapted in each case can be generated at least semi-automatically, in which input text files at least one relevant image feature and/or at least one value indication is refined further and further, in particular in evolutionary steps that build on one another. By applying the evolutionary algorithm, the text prompt engineering effort can be reduced, since an adaptation of the input text files can be carried out on the basis of the results of the preceding ascertaining stage. It is self-evident that other, non-evolutionary algorithms can also be used.

In a preferred embodiment of the present invention, the classification algorithm and/or the text-into-image generation algorithm comprise in each case machine learning algorithms that are preferably pretrained. Generally, the classification algorithm and/or the text-into-image generation algorithm can comprise a machine learning algorithm or an analytically operating algorithm or a mixing algorithm. The classification algorithm and/or the text-into-image generation algorithm can preferably be pretrained by incorporating domain knowledge and/or expert knowledge and/or labeled training data.

In a preferred embodiment of the present invention, the machine learning algorithm comprises a polynomial regression method and/or a method of regression by means of an in particular multi-layered neural network. Other machine learning approaches are also possible in principle. For example, the machine learning algorithm can be designed at least partially as a neural network and/or as a monitored learning algorithm and/or as a partially monitored learning algorithm and/or as an unmonitored learning algorithm and/or as a reinforcement learning algorithm. Hybrid algorithms, which link multiple machine learning approaches to one another, can also be used.

The present invention further relates to a computer program having program code in order to carry out at least parts of the method according to the present invention according to any embodiment when the computer program is executed on a computer.

The present invention further relates to a computer-readable data carrier having program code of a computer program in order to carry out at least parts of the method according to the present invention according to any embodiment when the computer program is executed on a computer.

The described embodiments and developments of the present invention can be combined with one another as desired.

Further possible embodiments, developments and implementations of the present invention also include combinations not explicitly mentioned of features of the present invention described above or in the following relating to the exemplary embodiments of the present invention.

The figures are intended to impart further understanding of the example embodiments of the present invention. They illustrate example embodiments of the present invention and, in connection with the description, serve to explain principles and concepts of the present invention.

Other embodiments and many of the mentioned advantages are apparent from the figures. The illustrated elements of the figures are not necessarily shown to scale relative to one another.

BRIEF DESCRIPTION OF THE DRAWINGS

In the figures of the drawings, identical reference signs denote identical or functionally identical elements, parts or components, unless stated otherwise.

DETAILED DESCRIPTION OF EXAMPLE EMBODIMENTS

Figure 1:
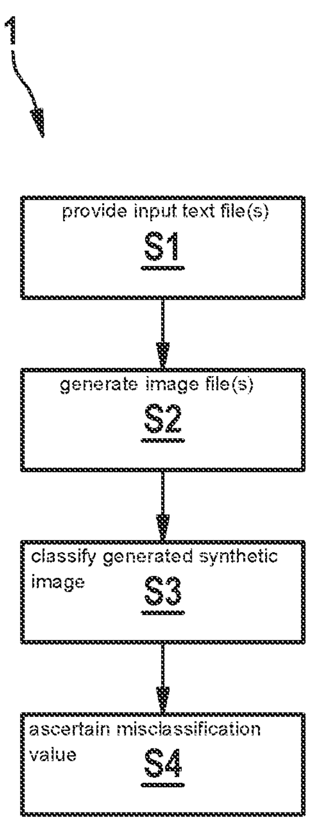
FIG. 1 shows a flowchart of the method according to an example embodiment of the present invention.

FIG. 1 shows a schematic flowchart of a computer-implemented method for ascertaining a misclassification value during the classification of images into at least one image category by a classification algorithm.

In any embodiment, the method can be carried out at least partially by a system 1 that can comprise, for this purpose, multiple components (not shown in detail), for example one or more providing devices and/or at least one evaluating and computing device. It is self-evident that the providing device can be designed together with the evaluating and computing device, or can be different therefrom. Furthermore, the system can comprise a storage device and/or an output device and/or a display device and/or an input device.

According to the present invention, the computer-implemented method comprises at least the following steps:

In a step S1, providing at least one input text file comprising a keyword by means of which the input text file is assigned to a predetermined image category of a plurality of image categories. The input text file comprises indications relating to at least one image feature for the predetermined image category and at least one value indication for the at least one image feature. "A cow with the color purple" can be mentioned here by way of example as an input text file, where "cow" is the keyword assigning the image category, where "color" is an exemplary image feature, and where "purple" is the value indication. Of course, the aforementioned input text file is only exemplary in nature. In the present example, the predetermined image category is "cow".

In a step S2, at least one image file is generated by means of a text-into-image generation algorithm, which comprises a synthetic image that is assigned to the predetermined image category and has the at least one image feature and the at least one value indication. Based on the aforementioned example of an input text file, an image comprising a purple cow is thus generated.

In a step S3, the generated, synthetic image is classified by the classification algorithm into at least one of the plurality of image categories. Based on the aforementioned example, the generated image comprising the purple cow is classified into an image category or assigned to such an image category. If the classification algorithm is working correctly, the generated image should actually be classified into the "cow" category.

In a step S4, the misclassification value is ascertained by comparing the image category classified by the classification algorithm with the predetermined image category. For example, it is possible for the classification algorithm to incorrectly assign the generated image with the purple cow to another category, since, for example, it incorrectly fails to identify a cow due to the "purple" coloring, for example if the classification algorithm has not learned this during training, since the training data provided did not include such an image of a cow with a corresponding label. For such an incorrect classification, a misclassification value is then ascertained, which for example in the simplest case indicates whether the image was classified correctly (numerically "1") or incorrectly (numerically "0"). This feedback check is possible according to the present invention, since the synthetically generated images comprise a unique indication for the predetermined image category corresponding to the keyword, namely before the image is generated and classified by the classification algorithm.

In mathematical terms, according to the present invention, a pretrained (image) classification algorithm f: $X \rightarrow C$ is assumed, which assigns an image $x \in X$ to a class $c \in C$. Furthermore, images are preferably provided that originate from a distribution x~D and for which C is a basic truth value, i.e., in other words, each of the provided images is unambiguously assigned to category c.

Of interest according to the present invention is a systematic error of f, i.e., for subsets i=1 . . . K of data $X^{(i)} \subset X$ which preferably satisfy at least one of the following conditions:

(i) a sufficient probability of occurrence of the systematic error under $\mathcal{D}$: $[\int_{x \in X(i)} p_D(x)] > \varepsilon$; and/or (ii) the same basic truth class c for $X^{(i)}$: $\exists c{:}C(x)=c \forall x \in X^{(i)}$;

(iii) a high probability of error of f to $X^{(i)}$:P[f(x) $X^{(i)}$: $\mathbb{P}[f(x) \neq C(x)] \geq \kappa$; and/or (iv) all data of $X^{(i)}$ have certain properties.

The last condition (vi) can be realized, for example, by a corresponding feature classification $A_j$, which attributes $a=A_j(x)$ assign to the data x. In this case, the condition (iv) can preferably be interpreted as $\exists j, a{:}A_j(x)=a \forall x \in X^{(i)}$.

Furthermore, according to the present invention, a provided text-into-image generation algorithm g: $T \times N \rightarrow X$ is assumed, for example the conventional text-into-image generation algorithm "Stable Diffusion" (https://huggingface.co/CompVis/stable-diffusion). Here, $t \in T$ is preferably an input text file or text prompt, and $n \in N$ is preferably at least one randomly selected disturbance variable. Alternatively, this can be considered as a distribution x~G(t), wherein the at least one disturbance variable is preferably part of the distribution, and the distribution preferably depends on the input text file or the text request t associated therewith. If g was trained such that it generates data from D (or a similar distribution), x~G(t) is preferably generated such that the above condition (i) for data from G(t) is met. If the text request is designed accordingly, x~G(t) preferably belongs to a target class c, i.e., C(x)=c with at least one characteristic $a=A_j(x)$. This preferably meets the conditions (ii) and (iv). For example, for an input text file or input request such as "an image of a cow with the color purple," images of the class "cow" are generated in which the color attribute has the value "purple."

The specific design of input text files T, which allow the coding of different combinations of class C(x)=c and attribute values $a_{j1}=A_{j1}(x)$, . . . , $a_{jk}=A_{jk}$ (x) can preferably be designed flexibly. An option for such an input text file can read "An image of class c with $A_{j1}$ $a_{j1}$ and $A_{j2}$ $a_{j2}$," where $A_{j1}$ $a_{j1}$ can stand for example for "color purple" ($A_{j1}$=color and $a_{j1}$=purple).

In a preferred template instantiation of such an input text file, the space for structuring such an input text file increases combinatorially with the number of possible attributes $A_j$, j=1 . . . $K_j$. As the number of features increases, it becomes difficult to obtain a combination of features that has a high misclassification rate and thus leads to systematic errors within the meaning of condition (iii). In order to solve this problem, according to the present invention, the use of metaheuristic optimization algorithms is preferred, e.g. an evolutionary algorithm that manages a population of genotypes, which preferably code input text files and particularly preferably from tuples of the form g=(c, ($A_{j1}$, $a_{j1}$), . . . , ($A_{jk}$, $a_{jk}$)). These genotypes can preferably be converted into input text files by instantiating the template. The target function that is to be maximized by the metaheuristic is preferably the misclassification rate for the generated data, i.e., arg max $P_{X \sim G(T(g))}[f(x) \neq c]$. If the metaheuristic is an evolutionary algorithm, the mutation operators on the genotypes can preferably comprise the following: "change the target class c" and/or "add an attribute-value combination ($A_{jk}$, $a_{jk}$)" and/or "remove an attribute-value combination" and/or "change the value of the attribute $A_{jk}$ to a random value," etc.

Figure 2:
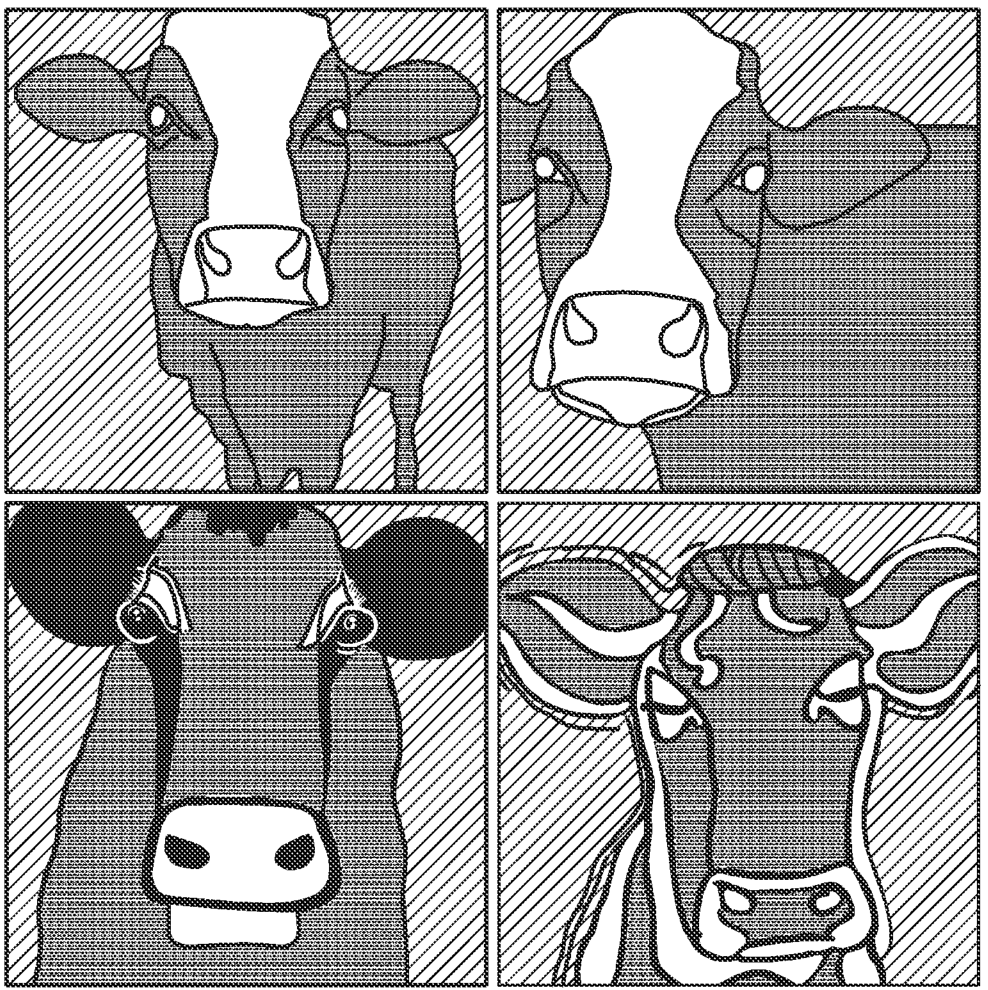
FIG. 2 shows an exemplary representation of generically generated images of a specific class c that are to be classified.

FIG. 2 shows by way of example 4 synthetically generated images, which all show the image category "cow,"

wherein at least one image feature and/or a value indication for a corresponding image feature was varied between the images. For example, the image shown at the top left shows a purple cow in front of a green background. For example, the image at the top right shows a purple cow in front of another green background. For example, the image at the bottom left shows a purple cow in a graphical representation in front of a purple background. For example, the image at the bottom right shows a purple cow in another graphical representation in front of another purple background. It is possible, for example, for the classification algorithm to classify the lower two images incorrectly due to the purple background and thus to fail to assign them to the image category "cow," for example.

What is claimed is:

1. A computer-implemented method for ascertaining a misclassification value in classification of images into at least one image category by a classification algorithm, the method comprising the following steps:

providing at least one input text file, which includes a keyword using which the input text file is assigned to a predetermined image category of a plurality of image categories, wherein the input text file includes indications relating to at least one image feature for the predetermined image category and at least one value indication for the at least one image feature;

generating at least one image file using a text-into-image generation algorithm, the image file including a synthetic image that is assigned to the predetermined image category and has the at least one image feature and the at least one value indication;

classifying the synthetic image in the generated image file using the classification algorithm into at least one of the plurality of image categories; and ascertaining the misclassification value by comparing the image category classified by the classification algorithm with the predetermined image category:

wherein the at least one input text file contains multiple input text files, which each includes the keyword assigned to the predetermined image category, and in which the indication relating to the at least one image feature and/or the relevant at least one value indication for the image feature is varied; wherein, for each respective input text file of the multiple input text files, a respective image file is generated, the respective image file including a respective synthetic image that is assigned to the predetermined image category and has the at least one image feature of the respective input text file and the at least one value indication of the respective input text file; wherein each of the generated, synthetic images is classified by the classification algorithm into at least one of the plurality of image categories, and wherein a respective misclassification value is ascertained for each of the classified images.

2. The computer-implemented method according to claim 1, wherein the method further comprises:

storing the ascertained respective misclassification value to the respective input text file.

3. The computer-implemented method according to claim 1, wherein the method further comprises:

ascertaining for which of the respective input text files a highest misclassification value is ascertained.

4. The computer-implemented method according to claim 3, wherein the method further comprises:

generating further text files based on the ascertained respective input text file, in which further text files the value indications for the image feature of the ascertained respective input text file is varied.

5. The computer-implemented method according to claim 4, wherein the method further comprises:

generating respective further image files based of the generated further text files.

6. The computer-implemented method according to claim 5, wherein the method further comprises:

classifying respectively generated synthetic images in the respective further image files using the classification algorithm into at least one of the plurality of image categories.

7. The computer-implemented method according to claim 6, wherein the method further comprises:

ascertaining a respective misclassification value for each of the classified respectively generated synthetic images by comparing an image category classified by the classification algorithm with the predetermined image category.

8. The computer-implemented method according to claim 1, wherein the provision of the at least one input text file includes generating the at least one text file by an evolutionary algorithm.

9. The computer-implemented method according to claim 1, wherein the classification algorithm and/or the text-into-image generation algorithm include machine learning algorithms that are pretrained.

10. A system configured to ascertain a misclassification value during classification of images into at least one image category by a classification algorithm, the system comprising:

a providing device configured to provide at least one input text file, which includes a keyword busing which the input text file is assigned to a predetermined image category of a plurality of image categories, wherein the input text file includes indications relating to at least one image feature for the predetermined image category and at least one value indication for the at least one image feature; and an evaluating and computing device configured to:

execute a text-into-image generation algorithm to generate at least one image file, which includes a synthetic image that is assigned to the predetermined image category and has the at least one image feature and the at least one value indication, execute a classification algorithm to classify the synthetic image in the generated image file into at least one of the plurality of image categories; and ascertain the misclassification value by comparing the image category classified by the classification algorithm with the predetermined image category;

wherein the at least one input text file contains multiple input text files, which each includes the keyword assigned to the predetermined image category, and in which the indication relating to the at least one image feature and/or the relevant at least one value indication for the image feature is varied; wherein, for each respective input text file of the multiple input text files, a respective image file is generated, the respective image file including a respective synthetic image that is assigned to the predetermined image category and has the at least one image feature of the respective input text file and the at least one value indication of the respective input text file; wherein each of the generated, synthetic images is classified by the classification algorithm into at least one of the plurality of image categories, and wherein a respective misclassification value is ascertained for each of the classified images.

11. A non-transitory computer-readable data carrier on which is stored program code of a computer program for ascertaining a misclassification value in classification of images into at least one image category by a classification algorithm, the program code, when executed by a computer, causing the computer to perform the following steps:

providing at least one input text file, which includes a keyword using which the input text file is assigned to a predetermined image category of a plurality of image categories, wherein the input text file includes indications relating to at least one image feature for the predetermined image category and at least one value indication for the at least one image feature;

generating at least one image file using a text-into-image generation algorithm, the image file including a synthetic image that is assigned to the predetermined image category and has the at least one image feature and the at least one value indication;

classifying the synthetic image in the generated image file using the classification algorithm into at least one of the plurality of image categories; and ascertaining the misclassification value by comparing the image category classified by the classification algorithm with the predetermined image category;

wherein the at least one input text file contains multiple input text files, which each includes the keyword assigned to the predetermined image category, and in which the indication relating to the at least one image feature and/or the relevant at least one value indication for the image feature is varied; wherein, for each respective input text file of the multiple input text files, a respective image file is generated, the respective image file including a respective synthetic image that is assigned to the predetermined image category and has the at least one image feature of the respective input text file and the at least one value indication of the respective input text file; wherein each of the generated, synthetic images is classified by the classification algorithm into at least one of the plurality of image categories, and wherein a respective misclassification value is ascertained for each of the classified images.

* * * * *